US012712958B2

(12) United States Patent
Duan et al.

(10) Patent No.: US 12,712,958 B2
(45) Date of Patent: Aug. 18, 2026

(54) DISPLAY PANEL AND DISPLAY DEVICE

(71) Applicant: Wuhan China Star Optoelectronics Semiconductor Display Technology Co., Ltd., Wuhan (CN)

(72) Inventors: Yanqiang Duan, Wuhan (CN); Chao Dai, Wuhan (CN); Jialiang Tang, Wuhan (CN); Wen Han, Wuhan (CN); Zongwei Liu, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 297 days.

(21) Appl. No.: 18/579,394

(22) PCT Filed: Dec. 11, 2023

(86) PCT No.: PCT/CN2023/137847
§ 371 (c)(1),
(2) Date: Jan. 15, 2024

(87) PCT Pub. No.: WO2025/118310
PCT Pub. Date: Jun. 12, 2025

(65) Prior Publication Data

US 2025/0184419 A1 Jun. 5, 2025

(30) Foreign Application Priority Data

Dec. 5, 2023 (CN) ........................ 202311668882.4

(51) Int. Cl.
*H04M 1/02* (2006.01)

(52) U.S. Cl.
CPC ................................ *H04M 1/0269* (2022.02)

(58) Field of Classification Search
CPC .. H04M 1/0269; H04M 1/026; H04M 1/0254; H04M 1/0266; G06F 1/1652
See application file for complete search history.

(56) References Cited

U.S. PATENT DOCUMENTS

2015/0108439 A1 4/2015 Kim et al.
2019/0152831 A1* 5/2019 An ........................ H05K 1/147
(Continued)

FOREIGN PATENT DOCUMENTS

CN 112848538 5/2021
CN 114038339 2/2022
(Continued)

OTHER PUBLICATIONS

International Search Report and the Written Opinion Dated Jan. 29, 2024 From the International Searching Authority Re. Application No. PCT/CN2023/137847 and Its Translation Into English. (16 Pages).

*Primary Examiner* — John J Lee

(57) ABSTRACT

A display panel and a display device are disclosed in the present application. The display panel further includes a panel body, a back plate, and a bending protecting layer. The panel body includes a display portion, and the display portion is located in a planar display area and a curved display area. The back plate is provided on a side of the display portion and in the planar display area and the curved display area. The bending protecting layer is disposed on a side of the back plate away from the display portion and at least in the corner curved sub-area. Material of the bending protecting layer includes a plastic metal material.

19 Claims, 7 Drawing Sheets

(56) References Cited

U.S. PATENT DOCUMENTS

| | | | | |
|---|---|---|---|---|
| 2019/0239372 | A1* | 8/2019 | Park | H04B 1/3888 |
| 2024/0040919 | A1* | 2/2024 | You | B32B 15/18 |

FOREIGN PATENT DOCUMENTS

| | | |
|---|---|---|
| CN | 115116335 | 9/2022 |
| CN | 115273663 | 11/2022 |
| CN | 116259231 | 6/2023 |

* cited by examiner

DISPLAY PANEL AND DISPLAY DEVICE

RELATED APPLICATIONS

This application is a National Phase of PCT Patent Application No. PCT/CN2023/137847 having International filing date of Dec. 11, 2023, which claims the benefit of priority of Chinese Patent Application No. 202311668882.4 filed on Dec. 5, 2023. The contents of the above applications are all incorporated by reference as if fully set forth herein in their entirety.

TECHNICAL FIELD

The present application relates to the field of display technologies, and more particularly, to a display panel and a display device.

BACKGROUND

With change of people's understanding on aesthetic and development of mobile terminal products, appearance of mobile terminals with round curves is gradually pursued, and many curved surface screen terminals appear in the market. Currently, both sides of a multi-curved surface screen are curved surfaces, that is, double-curved surface screen. Products with double-curved surface screen are numerous and the technical research becomes more and more perfect. However, four-curved surface screens are gradually becoming the market hot spot owe to advantages of more elegant curve, differential appearance, frontal frame-free, and the like. The four-curved surface screen is also an inevitable trend of mobile terminal development.

In four-curved surface screens, curved surface areas are prone to wrinkles and bubbles, especially in corner areas.

SUMMARY

An embodiment of the present application provides a display panel and a display device, which can improve a phenomenon that a display panel generates wrinkles and bubbles in a curved display area.

An embodiment of the present application provides a display panel including a planar display area and a curved display area adjacent to the planar display area, where the curved display area includes a plurality of side curved sub-areas located on a peripheral side of the planar display area and a corner curved sub-area located between adjacent side curved sub-areas of the plurality of side curved sub-areas, and the display panel further includes:

- a panel body including a display portion located in the planar display area and the curved display area;
- a back plate provided on a side of the display portion and located in the planar display area and the curved display area; and
- a bending protecting layer disposed on a side of the back plate away from the display portion and located at least in the corner curved sub-area;
- material of the bending protecting layer includes a plastic metal material.

According to the above object of the present application, an embodiment of the present application further provides a display device including a display panel including a planar display area and a curved display area adjacent to the planar display area, where the curved display area includes a plurality of side curved sub-areas located on a peripheral side of the planar display area and a corner curved sub-area located between adjacent side curved sub-areas of the plurality of side curved sub-areas, and the display panel further includes:

- a panel body including a display portion located in the planar display area and the curved display area;
- a back plate provided on a side of the display portion and located in the planar display area and the curved display area; and
- a bending protecting layer disposed on a side of the back plate away from the display portion and located at least in the corner curved sub-area;
- material of the bending protecting layer includes a plastic metal material.

DETAILED DESCRIPTION OF THE EMBODIMENTS

Figure 1:
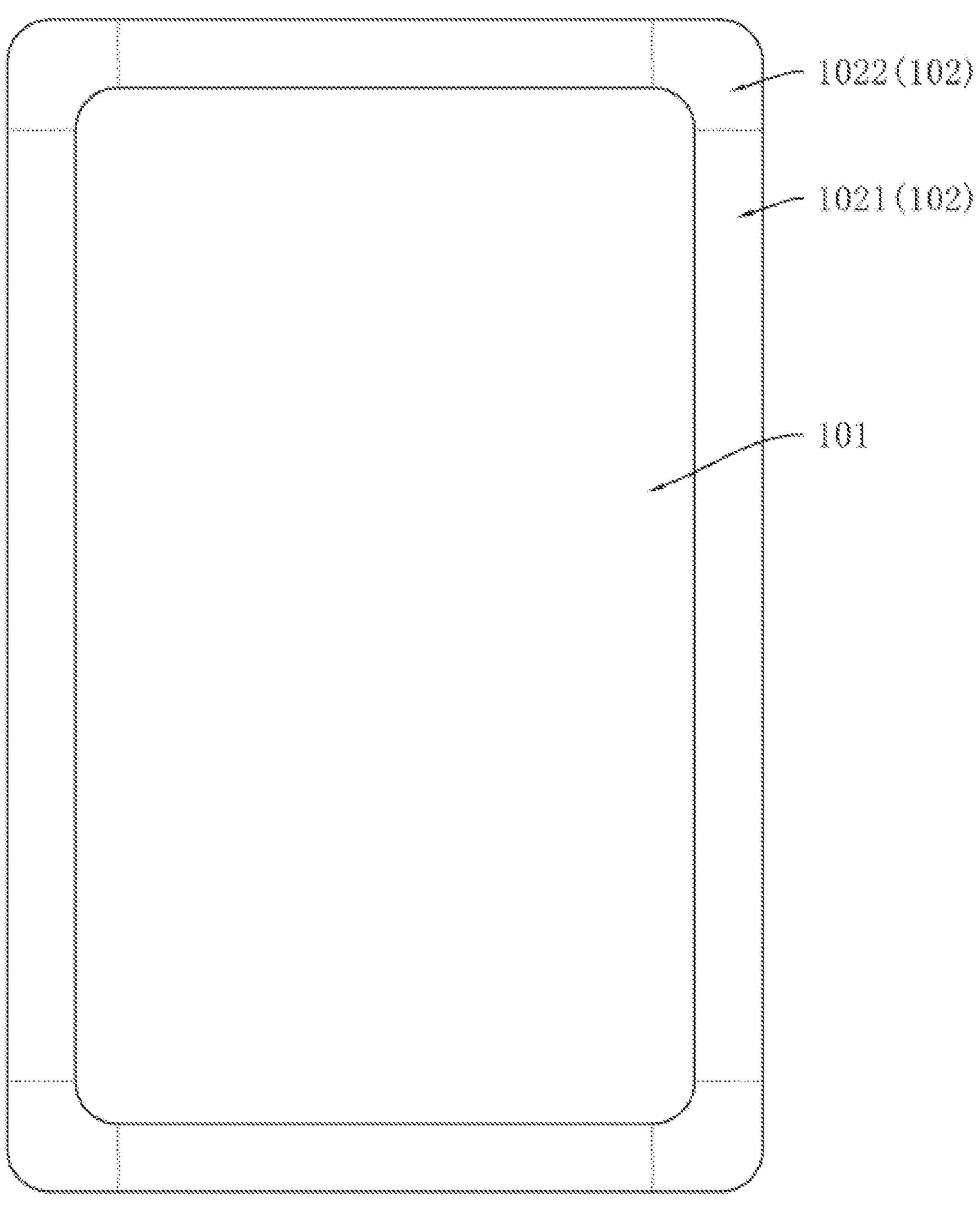
FIG. 1 is a schematic plan view of a display panel according to an embodiment of the present application.

The technical solution in the embodiments of the present application will be clearly and completely described with reference to the accompanying drawings. It should be understood that the described embodiments are only part of the examples of the present application, and not all examples. Based on the embodiments in the present application, all other embodiments obtained by a person skilled in the art without involving any inventive effort are within the scope of the present application.

The following disclosure provides many different embodiments or examples for implementing the different structures of the present application. In order to simplify the disclosure of the present application, components and arrangements of specific examples are described below. The description merely provides examples and is not intended to limit the application. In addition, the present application may repeat reference numerals and/or reference letters in various examples, and such repetition is for the purpose of simplicity and clarity, without indicating a relationship between the various embodiments and/or arrangements discussed. In addition, the present application provides examples of various specific processes and materials, but one of ordinary skill in the art will recognize the application of other processes and/or the use of other materials.

In related art, in the process of forming a four-curved surface display panel, it is necessary to bend a part of the display panel located in the curved-surface area and fit into the curved-surface of the cover plate. However, the adhesive layer between the display panel and the cover plate is not enough to overcome the rebound force of the display panel, so that the display panel is detached from the cover plate, and rebound bubbles occur in the curved-surface area of the display panel, particularly in the corner area of the curved-surface.

Figure 2:
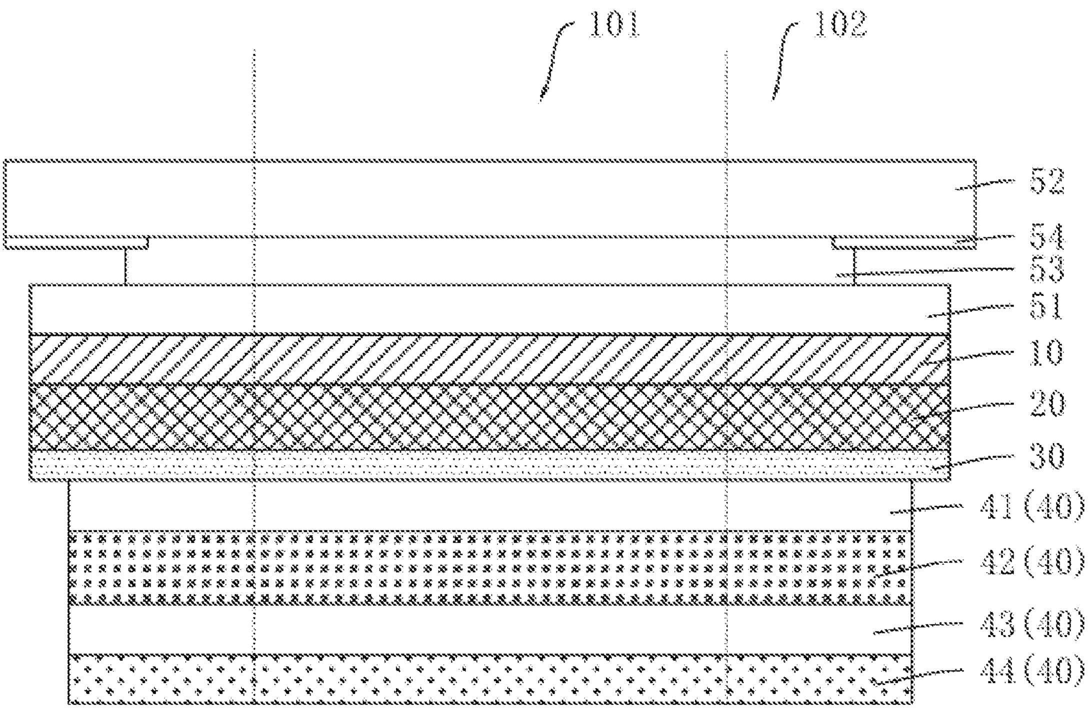
FIG. 2 is a schematic sectional view of a display panel according to an embodiment of the present application.

Referring to FIG. 1 and FIG. 2, an embodiment of the present application provides a display panel including a planar display area 101 and a curved display area 102 adjacent to the planar display area 101. The curved display area 102 includes a plurality of side curved sub-areas 1021 disposed on a circumferential side of the planar display area 101 and a corner curved sub-area 1022 connected between adjacent side curved sub-areas 1021.

The display panel further includes a panel body 10, a back plate 20, and a bending protecting layer 30. The panel body 10 includes a display portion 11 located in the planar display area 101 and the curved display area 102. The back plate 20 is disposed on a side of the display portion 11, and is located in the planar display area 101 and the curved display area 102. The bending protecting layer 30 is disposed on a side of the back plate 20 away from the display portion 11 and is located at least in the corner curved sub-area 1022.

Further, material of the bending protecting layer 30 includes a plastic metal material.

For practical application, in the embodiment of the present application, the bending protecting layer 30 is provided on the back side of the display panel and is made of the plastic metal material, as such, at least the supporting effect on the corner curved surface sub-area 1022 of the display portion 11 is enhanced, to improve the binding on the display portion 11 in the corner curved surface sub-area 1022, and to reduce the probability of generating rebound bubbles due to the formation of the curved surface in the display portion 11. Thus, the phenomenon that the display panel generates wrinkles and bubbles in the curved display area 102 is improved.

In an embodiment of the present application, the bending protecting layer is further located in the side curved sub-area.

In an embodiment of the present application, the bending protecting layer is further located in the planar display area.

In an embodiment of the present application, the back plate is provided with a groove on a side away from the display portion, and the bending protecting layer is provided in the groove.

In an embodiment of the present application, the display panel further includes a composite functional layer, and the bending protecting layer is disposed between the back plate and the composite functional layer.

In an embodiment of the present application, the composite functional layer includes a metal layer disposed on a side of the bending protecting layer away from the back plate, and the plasticity of the bending protecting layer is greater than the plasticity of the metal layer.

In an embodiment of the present application, the material of the bending protecting layer and the material of the metal layer each include at least one of copper and aluminum.

In an embodiment of the present application, the composite functional layer further includes a buffer layer disposed between the metal layer and the bending protecting layer, and a first adhesive layer disposed between the buffer layer and the bending protecting layer, and a thickness of the metal layer is less than or equal to a thickness of the first adhesive layer.

In an embodiment of the present application, the panel body further includes a binding portion on a side of the composite functional layer away from the bending protecting layer, and a support back plate disposed between the binding portion and the composite functional layer, and the thickness of the support back plate is greater than the thickness of the back plate.

In an embodiment of the present application, the display panel further includes a cover plate disposed on a side of the display portion away from the back plate, a portion of the cover plate in the curved display area is bent toward the display portion, and the display portion, the back plate, and the bending protecting layer is attached to the cover plate at least in the corner curved sub-area; and an orthographic projection of the bending protecting layer on the cover plate is in an orthographic projection of the back plate on the cover plate, and a boundary of the orthographic projection of the bending protecting layer on the cover plate is spaced from a boundary of the orthographic projection of the back plate on the cover plate.

In an embodiment of the present application, the display panel further includes an adhesive layer disposed between the cover plate and the display portion, and the adhesive layer has a thickness of less than 175 microns.

In an embodiment of the present application, the bending protecting layer includes a support sub-layer and an adhesive sub-layer stacked, and the support sub-layer is attached to a side of the back plate away from the display portion through the adhesive sub-layer.

In an embodiment of the present application, a thickness of the bending protecting layer is greater than or equal to 5 microns.

In an embodiment of the present application, in a case that a compression amount of the display portion in the curved display area is less than or equal to 300 microns, the thickness of the bending protecting layer is less than or equal to 10 microns;

in a case that the compression amount of the display portion in the curved display area is greater than 300 microns and less than or equal to 500 microns, the thickness of the bending protecting layer is greater than 10 microns and less than or equal to 20 microns; and the compression amount of the display portion in the curved display area is greater than 500 microns, and the thickness of the bending protecting layer is greater than or equal to 15 microns, and less than or equal to 30 microns.

Referring to FIG. 1 and FIG. 2, the display panel includes a planar display area 101 and a curved display area 102 adjacent to the planar display area 101. The curved display area 102 includes a plurality of side curved sub-areas 1021 disposed on a circumferential side of the planar display area 101 and a corner curved sub-area 1022 connected between adjacent side curved sub-areas 1021.

In an embodiment, the planar display area 101 may be rectangular, and the number of the side curved sub-areas 1021 may be four and located around the planar display area 101. Each of four corners of the planar display area 101 has the corner curved sub-area 1022, and the corner curved sub-area 1022 is connected between adjacent side curved sub-areas 1021. It should be understood that the display panel is bent in the curved display area 102 toward a side away from the light-emitting side to define a four-curved surface display panel. Therefore, the four sides and the four corners of the display panel are curved to achieve display effect of narrower bezel. The embodiment of the present application is described by taking the number of curved surfaces and the bending direction of the display panel as examples, but the present application is not limited thereto. In the drawings provided in the present application, the display panel is shown as the schematic diagram, and the bending of each film layer structure in the curved display area 102 is not detailed.

Referring to FIG. 1 and FIG. 2, in an embodiment of the present application, the display panel includes a panel body 10, and the panel body 10 includes a display portion 11. The display panel further includes a polarizer 51 disposed on the light-emitting side of the display portion 11, an adhesive layer 53 and a cover plate 52 disposed on the side of the polarizer 51 away from the display portion 11, a back plate 20 disposed on the side of the display portion 11 away from the polarizer 51, and a composite functional layer 40 disposed on the side of the back plate 20 away from the display portion 11. The display portion 11, the back plate 20, the polarizer 51, and the cover plate 52 are all located in the planar display area 101 and the curved display area 102, and may be located in the side curved sub-area 1021 and the corner curved sub-area 1022.

The cover plate 52 is attached to the side of the polarizer 51 away from the display portion 11 by the adhesive layer 53, and the display panel further includes a light-shielding layer 54 provided at the edge of the cover plate 52. The light-shielding layer 54 may be a black ink to provide a light-shielding effect. The cover plate 52 is a curved cover plate, and the peripheral sides of the cover plate 52 are curved. The cover plate 52 is disposed corresponding to the curved display area 102, to achieve the display effect of narrow bezel by defining a curved surface at the curved display area 102 after attaching the polarizer 51, the display portion 11, and the back plate 20 with the cover plate 52. It should be understood that the display panel is shown as the schematic diagram in the drawings of the present application, and the bending of each film layer structure in the curved display area 102 is not detailed.

Further, both sides of the display portion 11 are provided with the polarizer 51 and the back plate 20, respectively. As for better elasticity of the polarizer 51 and the back plate 20, the adhesive layer is not enough to overcome the rebound force during attaching the cover plate 52. As such, the polarizer 51, the display portion 11, the back plate 20, and the cover plate 52 are separated to generate rebound bubbles.

Accordingly, the display panel further includes a bending protecting layer 30 disposed between the back plate 20 and the composite functional layer 40, the material of the bending protecting layer 30 includes the plastic metal material, and the bending protecting layer 30 is located at least in the corner curved sub-area 1022. The display portion 11, the polarizer 51, the back plate 20, and the bending protecting layer 30 are attached to the cover plate 52 at least in the corner curved sub-area 1022. Since the plastic metal material has better plasticity, the bending protecting layer 30 has a strong ability to resist bending deformation after forming a curved surface, and at least the polarizer 51, the display portion 11, and the back plate 20 located in the corner curved sub-area 1022 can be restrained to reduce the probability that the display portion 11 is separated from the cover plate 52 due to the rebound force. Thus, the occurrence of rebound bubbles among the polarizer 51, the display portion 11, and the back plate 20 and the cover plate 52 is reduced, to improve the yield of the display panel.

It should be noted that in the related art, in order to overcome the elastic force of the display portion 11, the polarizer 51, and the back plate 20, the thickness of the adhesive layer 53 is generally increased, and is generally greater than or equal to 175 microns, which causes the overall thickness of the display panel to be increased and prevents the display panel from being thinned. In the embodiment of the present application, the bending protecting layer 30 is added, as such, the elastic force of the display portion 11, the polarizer 51, and the back plate 20 can be overcome without increasing the thickness of the adhesive layer 53. Therefore, in the embodiment of the present application, the thickness of the adhesive layer 53 does not need to be increased, and the thickness of the adhesive layer 53 may be less than 175 microns, for example, may be 150 microns.

In an embodiment, the composite functional layer 40 includes a first adhesive layer 41, a buffer layer 42, a second adhesive layer 43, and a metal layer 44 disposed in sequence on the side of the bending protecting layer 30 away from the back plate 20. The first glue layer 41 is made of gird glue (Embo) and has an effect of discharging bubbles. The material of the buffer layer 42 is foam and can function as cushioning the stress. The second adhesive layer 43 may be a PSA glue. The metal layer 44 is made of copper, aluminum alloy, stainless steel, and the like. As such, the composite functional layer 40 can function as light shielding, heat dissipation, electrostatic discharge, signal shielding, supporting, and the like.

Herein, the material of the bending protecting layer 30 may include at least one of copper or aluminum, that is, the material of the bending protecting layer 30 may be the same as the material of the metal layer 44, but the plasticity of the bending protecting layer 30 is greater than the plasticity of the metal layer 44. For example, in a case that the material of the metal layer 44 is rolled copper with better supporting, the material of the bending protecting layer 30 may be electrolytic copper, and the elastic modulus of the electrolytic copper is greater than or equal to 20 GPa, less than or equal to 50 GPa, and has high plasticity.

Figure 3:
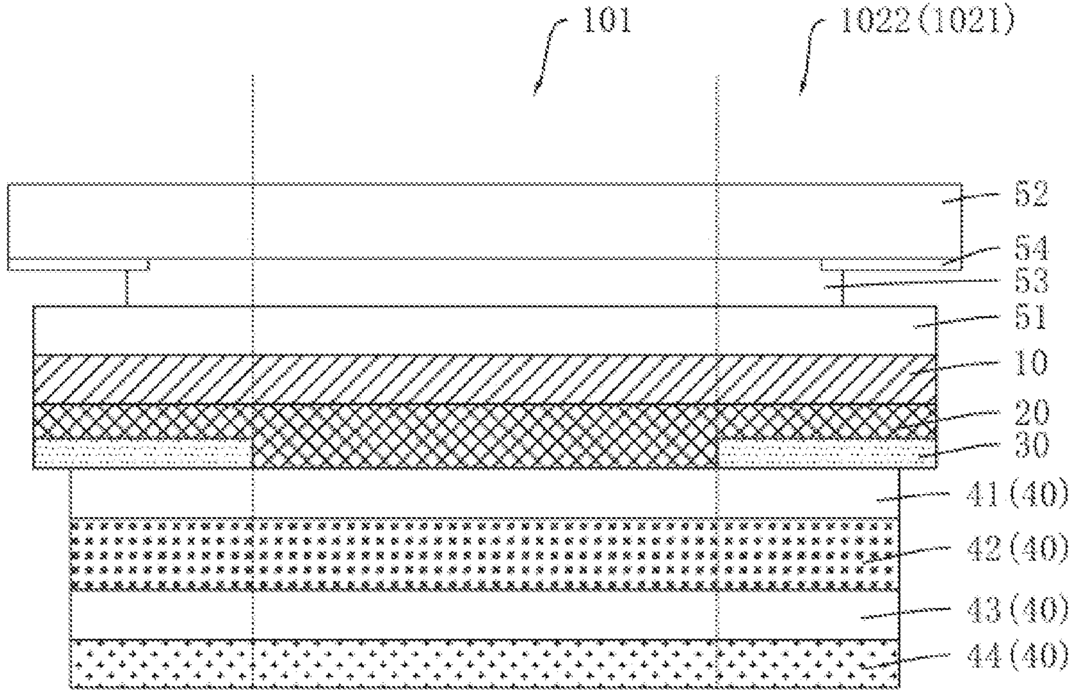
FIG. 3 is another schematic sectional view of a display panel according to an embodiment of the present application.

In an embodiment of the present application, referring to FIG. 3, the bending protecting layer 30 may be disposed in the corner curved sub-area 1022 and not disposed in the side curved sub-area 1021 and the planar display area 101.

Alternatively, the bending protecting layer 30 may be disposed in the corner curved sub-area 1022 and the side curved sub-area 1021, and may not be disposed in the planar display area 101.

The back plate 20 is provided with a groove on a side away from the display portion 11, and the bending protecting layer 30 may be provided in the groove, and the thickness of the bending protecting layer 30 is less than or equal to the depth of the groove, so that the back plate 20 is formed with a flat surface on the side away from the display portion 11, to easily contact the composite functional layer 40.

Figure 4:
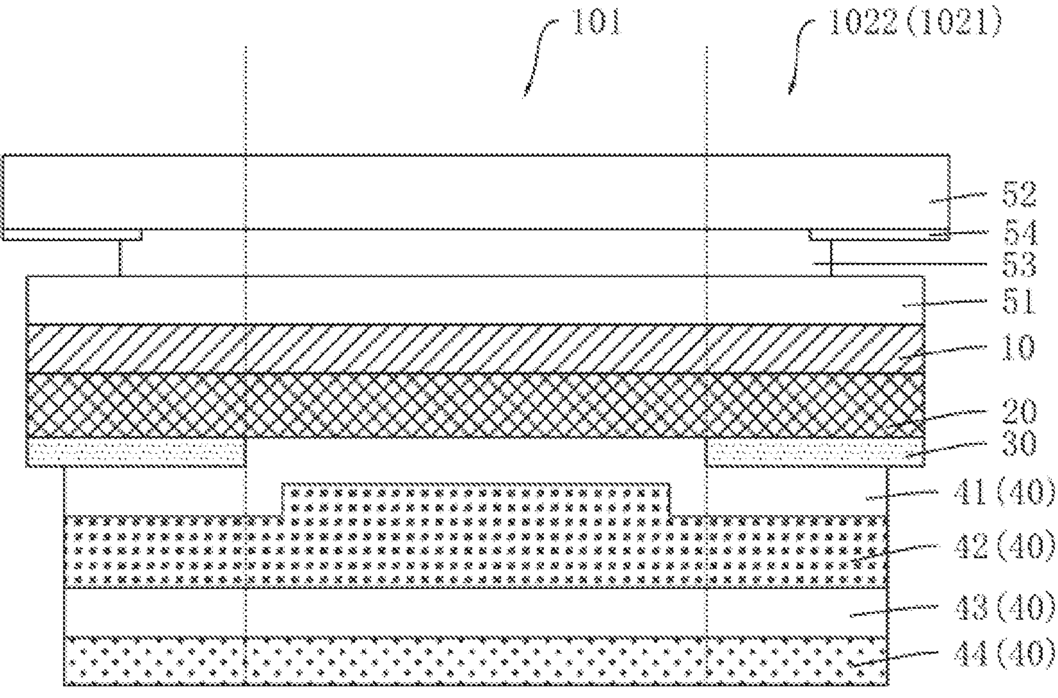
FIG. 4 is another schematic sectional view of a display panel according to an embodiment of the present application.

In another embodiment of the present application, referring to FIG. 4, the bending protecting layer 30 may be disposed in the corner curved sub-area 1022, and not disposed in the side curved sub-area 1021 and the planar display area 101.

Alternatively, the bending protecting layer 30 may be disposed in the corner curved sub-area 1022 and the side curved sub-area 1021, and may not be disposed in the planar display area 101.

The side of the back plate 20 away from the display portion 11 is flat, and the bending protecting layer 30 may be provided on the side of the back plate 20 away from the display portion 11. The buffer layer 42 may be attached to the bending protecting layer 30 through the first adhesive layer 41. Since the thickness of the buffer layer 42 is large, the buffer layer 42 may flatten the section step defined on the side of the back plate 20 away from the display portion 11 and caused by the provision of the bending protecting layer 30.

In another embodiment of the present application, referring to FIG. 2, the bending protecting layer 30 may be provided in the corner curved sub-area 1022, the side curved surface sub-area 1021, and the planar display area 101. That is, the bending protecting layer 30 may support the area of the display portion 11 located in the planar display area 101 and the curved display area 102, and the bending protecting layer 30 does not need to be provided for a specific area, thereby reducing the attaching difficulty and simplifying the process.

In an embodiment of the present application, since the bending protecting layer 30 has a good protective effect on the back side of the display portion 11, the thickness of the composite functional layer 40 can be reduced to reduce the overall thickness of the display panel.

The thickness of the buffer layer 42 and the thickness of the metal layer 44 may be thinned, for example, the thickness of the buffer layer 42 may be reduced from 120 microns to 100 microns, the thickness of the metal layer 44 may be reduced from 50 microns to 30 microns, and the sum of the reduced thicknesses of the buffer layer 42 and the metal layer 44 may be greater than the thickness of the bending protecting layer 30. As such, the overall thickness of the display panel is reduced.

It should be noted that since the bending protecting layer 30 has a strong supporting function, the thickness of the metal layer 44 can be reduced, and the thickness of the metal layer 44 is less than or equal to the thickness of the first adhesive layer 41. The thickness of the first adhesive layer 41 may be greater than or equal to 30 microns, and less than or equal to 40 microns.

Further, due to the strong supporting effect of the bending protecting layer 30, the thickness of the back plate 20 may be reduced, for example, the thickness of the back plate 20 may be less than or equal to 88 microns, and specifically, the thickness of the back plate 20 may be reduced to 75 microns, 65 microns, 50 microns, or 25 microns.

Figure 5:
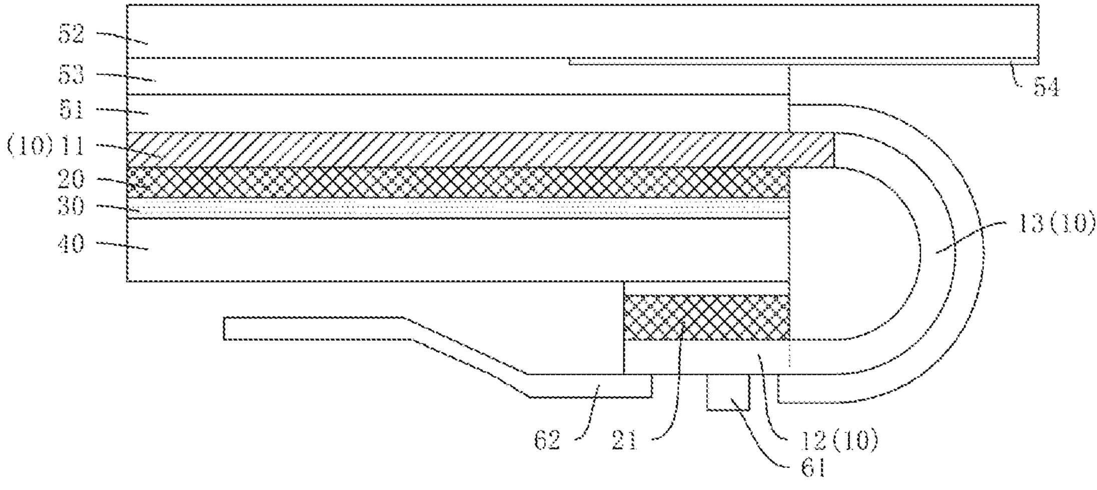
FIG. 5 is another schematic sectional view of a display panel according to an embodiment of the present application.

Further, referring to FIG. 1, FIG. 2, and FIG. 5, in an embodiment, the panel body 10 further includes a binding portion 12 on a side of the composite functional layer 40 away from the bending protecting layer 30, and a bending portion 13 connected between the display portion 11 and the binding portion 12. An end of the bending portion 13 is connected to the display portion 11, and another end of the bending portion 13 is bent toward the binding portion 12 and connected to the binding portion 12. The display panel further includes a support back plate 21 disposed on the side of the binding portion 12 close to the composite functional layer 40, and a driver chip 61 and a flexible circuit board 62 connected to the binding portion 12. The support back plate 21 serves as a support for the binding portion 12.

It should be noted that the back plate 20 and the back plate 21 are made of the same material and can be formed together in the manufacturing process. However, in the embodiment of the present application, the bending protecting layer 30 is provided on a side of the back plate 20, and the bending protecting layer 30 has a strong supporting function, so that the thickness of the back plate 20 can be reduced. Further, the thickness of the support back plate 21 cannot be reduced, in order to ensure the stiffness of the support back plate 21 itself and the supporting effect on the binding portion 12, and to prevent the wiring on the binding portion 12 from easily breakage. Therefore, in the present embodiment, the thickness of the back plate 20 is less than the thickness of the support back plate 21.

Figure 6:
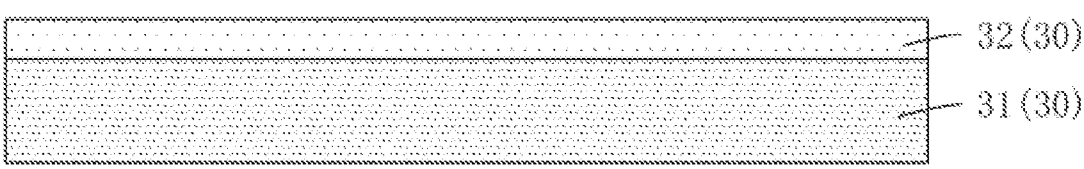
FIG. 6 is a schematic structural diagram of a bending protecting layer according to an embodiment of the present application.

In an embodiment, referring to FIG. 2 and FIG. 6, the bending protecting layer 30 includes a support sub-layer 31 and an adhesive sub-layer 32 stacked, the adhesive sub-layer 32 is disposed between the support sub-layer 31 and the back plate 20, and the support sub-layer 31 may be attached to the side of the back plate 20 away from the display portion 11 by the adhesive sub-layer 32.

In the embodiment of the present application, in order to ensure the supporting effect and the anti-deformation ability of the bending protecting layer 30, the thickness of the bending protecting layer 30 needs to be greater than or equal to 5 microns.

It should be noted that, according to the embodiment of the present application, it has been verified that, as the compression amount of the display portion 11 in the curved display area 102 increases, the rebound force of the display portion 11 increases, and the thickness of the bending protecting layer 30 needs to be increased to ensure supporting and anti-deformation effects correspondingly. The compression amount is the size of the display portion 11 before the bending and attaching minus the size of the display portion 11 after the bending and attaching. The size refers to the circumference of the display portion 11 in the curved display area 102 or the circumference of the display portion 11 in the corner curved sub-area 1022.

In an embodiment, in a case that the compression amount of the display portion 11 in the curved display area 102 is greater than or equal to 200 microns and less than or equal to 300 microns, the thickness of the bending protecting layer 30 is less than or equal to 10 microns. In a case that the compression amount of the display portion 11 in the curved display area 102 is greater than 300 microns and less than or equal to 500 microns, the thickness of the bending protecting layer 30 is greater than 10 microns and less than or equal to 20 microns. In a case that the compression amount of the display portion 11 in the curved display area 102 is greater than 500 microns, the thickness of the bending protecting layer 30 is greater than or equal to 15 microns and less than or equal to 30 microns. In this embodiment of the present application, the thickness of the bending protecting layer 30 is adjusted according to the change in the curvature of the side and the corner of the display panel, that is, according to the change in the compression amount of the display portion 11 in the curved display area 102. As such, the supporting and the anti-deformation ability of the bending protecting layer 30 are matched with the rebound force of the display portion 11. On the basis of improving the phenomenon of the bubbles appeared between the display portion 11 and the cover plate 52, the rigidity of the bending protecting layer 30 is prevented from being large due to the excessive thickness of the bending protecting layer 30 which causes the difficulty of the attach between the display portion 11 and the cover plate 52 in the curved display area 102.

In an embodiment, the orthographic projection of the bending protecting layer 30 on the cover plate 52 is in the orthographic projection of the back plate 20 on the cover plate 52, and the boundary of orthographic projection of the bending protecting layer 30 on the cover plate 52 is spaced from the boundary of the orthographic projection of the back plate 20 on the cover plate 52. That is, the edge of the bending protecting layer 30 is retracted inwards relative to the edge of the back plate 20. The probability that the edge of the bending protecting layer 30 exceeds the edge of the display portion 11 due to the influence of the attaching tolerance can be reduced to improve the attaching rate of the display panel.

Herein, the distance between the boundary of the orthographic projection of the bending protecting layer 30 on the cover plate 52 and the boundary of the orthographic projection of the back plate 20 on the cover plate 52 may be greater than or equal to 0.1 mm and less than or equal to 0.3 mm.

In this embodiment of the present application, the bending protecting layer 30 is provided on the back side of the display panel, and the material of the bending protecting layer 30 is the plastic metal material, so that at least the supporting effect on the corner curved sub-area 1022 of the display portion 11 is enhanced, to improve the binding of the display portion 11 in the corner curved surface sub-area 1022, and to reduce the probability of generating rebound bubbles due to the formation of the curved surface in the display portion 11. Thus, the phenomenon that the display panel generates wrinkles and bubbles in the curved display area 102 is improved.

In addition, an embodiment of the present application provides a method for manufacturing a display panel as above. Referring to FIG. 1, FIG. 2, FIG. 7, and FIG. 8, the method includes the followings.

An intermediate module is provided. The intermediate module includes a panel body 10, a back plate 20, and a bending protecting layer 30 attached therewith. Note that a display portion 11 of the panel body 10 is attached to the back plate 20 and the bending protecting layer 30.

In an embodiment, the intermediate module further includes a polarizer 51 and an adhesive layer 53 disposed on a side of the panel body 10 away from the back plate 20.

It should be noted that the intermediate module may be formed by cutting to obtain a formed back plate 20, then adhering a mother plate of a panel body 10 with the back plate 20 and cutting for formation, and then adhering with a cut-formed bending protecting layer 30 to obtain the intermediate module.

Alternatively, a cut-formed back plate 20 and a cut-formed bending protecting layer 30 may be obtained first, and the back plate 20 and the bending protecting layer 30 are adhered to each other, and then the mother plate of the panel body 10 is adhered to the back plate 20 and the bending protecting layer 30 to be cut to obtain the intermediate module.

Alternatively, the mother plate of the back plate 20 and the mother plate of the bending protecting layer 30 are attached, and the back plate 20 and the bending protecting layer 30 attached are cut to obtain, and then the back plate 20 and the bending protecting layer 30 are attached to the mother board of the panel body 10, and then cut to obtain the intermediate module.

Figure 7:
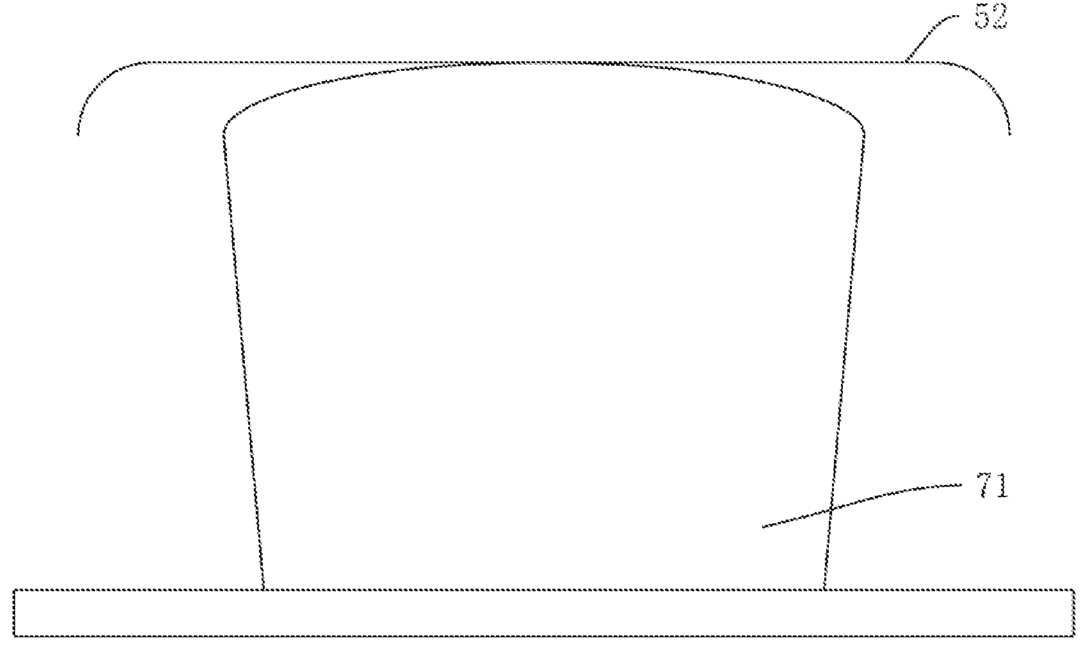
FIG. 7 is a schematic structural diagram of a bending device of a display panel according to an embodiment of the present application.
Figure 8:
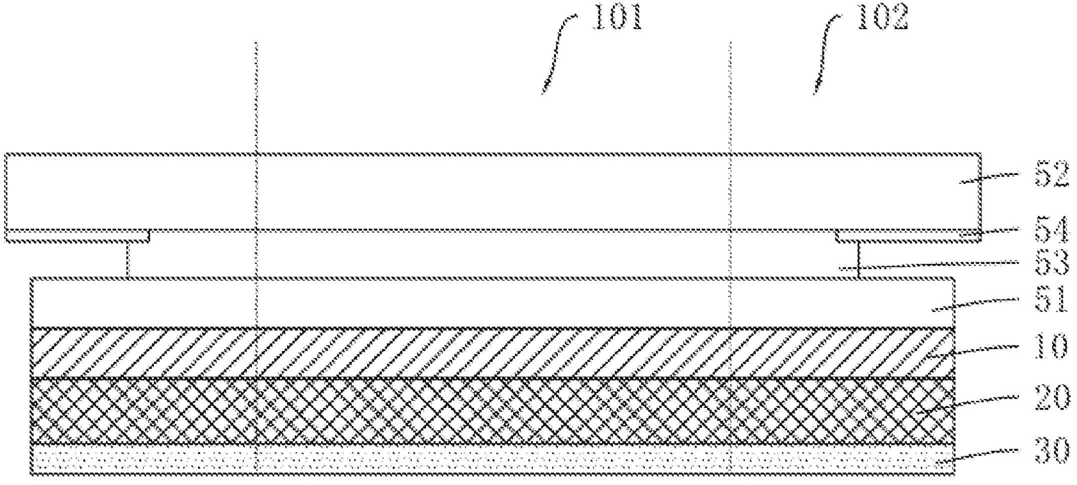
FIG. 8 is a schematic structural diagram of a curved display module according to an embodiment of the present application.

Then, the intermediate module and the cover plate 52 are attached to each other by the bending device 71 shown in FIG. 7 to obtain a display module as shown in FIG. 8. At this time, the bending protecting layer 30 is located on the side of the back plate 20 away from the display portion 11, to restrain and to provide anti-deformation of the display portion 11, the polarizer 51, and the back plate 20, thereby improving the occurrence of rebound bubbles in the attaching process of the display module.

It should be noted that, since the bending protecting layer 30 is added to the display panel provided in the embodiment of the present application, and the bending protecting layer 30 is made of the plastic metal material, as such, the attaching pressure in the curved display area 102 is increased and is greater than the attaching pressure in the planar display area 101, during the bending and attaching process.

As above, in the present embodiment, the bending protecting layer 30 is provided between the back plate 20 and the composite functional layer 40, the material of the bending protecting layer 30 includes the plastic metal material, and the bending protecting layer 30 is located at least in the corner curved sub-area 1022. Since the plastic metal material has good plasticity, the bending protecting layer 30 has a strong ability to resist bending deformation after forming a curved surface, and at least the polarizer 51, the display portion 11, and the back plate 20 located in the corner curved sub-area 1022 can be restrained to reduce the probability that the display portion 11 is separated from the cover plate 52 due to the rebound force, thereby reducing rebound bubbles among the polarizer 51, the display portion 11, and the back plate 20 and the cover plate 52, thereby improving the yield of the display panel.

Further, an embodiment of the present application further provides a display device including the display panel described in the above embodiments.

It should be understood that the display device has the same display panel as described in the above embodiments, as such, the display device shares the same beneficial effect as the display panel as described in the above embodiments, and details are not described herein.

In the above-mentioned embodiments, the description of each embodiment has its own emphasis, and parts not described in detail in a certain embodiment may be referred to the related description in other embodiments.

The present application has been described in detail with reference to a display panel and a display device according to embodiments of the present application. The principles and embodiments of the present application have been described with reference to specific examples. The description of the above embodiments is merely provided to help understand the technical solution and the core idea of the present application. It should be understood by those of ordinary skill in the art that modifications may still be made to the technical solutions described in the foregoing embodiments, or equivalents may be made to some of the technical features therein; and these modifications or equivalents do not depart the essence of the corresponding technical solutions from the scope of the technical solutions of the embodiments of the present application.

The invention claimed is:

1. A display panel, comprising a planar display area and a curved display area adjacent to the planar display area, wherein the curved display area comprises a plurality of side curved sub-areas located on a peripheral side of the planar display area and a corner curved sub-area located between adjacent side curved sub-areas of the plurality of side curved sub-areas, and the display panel further comprises:

- a panel body including a display portion located in the planar display area and the curved display area;
- a back plate provided on a side of the display portion and located in the planar display area and the curved display area; and
- a bending protecting layer disposed on a side of the back plate away from the display portion and located at least in the corner curved sub-area;
- wherein material of the bending protecting layer comprises a plastic metal material; and
- wherein the thickness of the bending protecting layer is less than or equal to 10 microns, in a case that a compression amount of the display portion in the curved display area is less than or equal to 300 microns;

the thickness of the bending protecting layer is greater than 10 microns and less than or equal to 20 microns, in a case that the compression amount of the display portion in the curved display area is greater than 300 microns and less than or equal to 500 microns; and the thickness of the bending protecting layer is greater than or equal to 15 microns and less than or equal to 30 microns, in a case that the compression amount of the display portion in the curved display area is greater than 500 microns.

2. The display panel of claim 1, wherein the bending protecting layer is further located in the plurality of side curved sub-areas.

3. The display panel of claim 1, wherein the bending protecting layer is further located in the planar display area.

4. The display panel of claim 1, wherein a groove is provided on a side of the back plate away from the display portion, and the bending protecting layer is provided in the groove.

5. The display panel of claim 1, wherein the display panel further comprises a composite functional layer, and the bending protecting layer is disposed between the back plate and the composite functional layer.

6. The display panel of claim 5, wherein the composite functional layer comprises a metal layer disposed on a side of the bending protecting layer away from the back plate, and plasticity of the bending protecting layer is greater than plasticity of the metal layer.

7. The display panel of claim 6, wherein material of the bending protecting layer and material of the metal layer each comprise at least one of copper and aluminum.

8. The display panel of claim 6, wherein the composite functional layer further comprises a buffer layer disposed between the metal layer and the bending protecting layer, and a first adhesive layer disposed between the buffer layer and the bending protecting layer, and a thickness of the metal layer is less than or equal to a thickness of the first adhesive layer.

9. The display panel of claim 5, wherein the panel body further comprises a binding portion on a side of the composite functional layer away from the bending protecting layer, and a support back plate disposed between the binding portion and the composite functional layer, and a thickness of the support back plate is greater than a thickness of the back plate.

10. The display panel of claim 1, wherein the display panel further comprises a cover plate provided on a side of the display portion away from the back plate, a portion of the cover plate in the curved display area is bent toward the display portion, and the display portion, the back plate, and the bending protecting layer are attached to the cover plate at least in the corner curved sub-area;

wherein an orthographic projection of the bending protecting layer on the cover plate is in an orthographic projection of the back plate on the cover plate, and a boundary of the orthographic projection of the bending protecting layer on the cover plate is spaced from a boundary of the orthographic projection of the back plate on the cover plate.

11. The display panel of claim 10, wherein the display panel further comprises an adhesive layer disposed between the cover plate and the display portion, and the adhesive layer has a thickness of less than 175 microns.

12. The display panel of claim 1, wherein the bending protecting layer comprises a support sub-layer and an adhesive sub-layer stacked, and the support sub-layer is adhered to a side of the back plate away from the display portion through the adhesive sub-layer.

13. The display panel of claim 1, wherein a thickness of the bending protecting layer is greater than or equal to 5 microns.

14. A display device, comprising a display panel including a planar display area and a curved display area adjacent to the planar display area, wherein the curved display area comprises a plurality of side curved sub-areas located on a peripheral side of the planar display area and a corner curved sub-area located between adjacent side curved sub-areas of the plurality of side curved sub-areas, and the display panel further comprises:

a panel body including a display portion located in the planar display area and the curved display area;

a back plate provided on a side of the display portion and located in the planar display area and the curved display area; and a bending protecting layer disposed on a side of the back plate away from the display portion and located at least in the corner curved sub-area;

wherein material of the bending protecting layer comprises a plastic metal material; and wherein the thickness of the bending protecting layer is less than or equal to 10 microns, in a case that a compression amount of the display portion in the curved display area is less than or equal to 300 microns;

the thickness of the bending protecting layer is greater than 10 microns and less than or equal to 20 microns, in a case that the compression amount of the display portion in the curved display area is greater than 300 microns and less than or equal to 500 microns; and the thickness of the bending protecting layer is greater than or equal to 15 microns and less than or equal to 30 microns, in a case that the compression amount of the display portion in the curved display area is greater than 500 microns.

15. The display device of claim 14, wherein the bending protecting layer is further located in the plurality of side curved sub-areas.

16. The display device of claim 14, wherein the bending protecting layer is further located in the planar display area.

17. The display device of claim 14, wherein a groove is provided on a side of the back plate away from the display portion, and the bending protecting layer is provided in the groove.

18. The display device of claim 14, wherein the display panel further comprises a composite functional layer, and the bending protecting layer is disposed between the back plate and the composite functional layer.

19. The display device of claim 18, wherein the composite functional layer comprises a metal layer disposed on a side of the bending protecting layer away from the back plate, and plasticity of the bending protecting layer is greater than plasticity of the metal layer.

* * * * *